(12) United States Patent
Shimosato

(10) Patent No.: US 10,070,044 B2
(45) Date of Patent: *Sep. 4, 2018

(54) ELECTRONIC APPARATUS, IMAGE SENSING APPARATUS, CONTROL METHOD AND STORAGE MEDIUM FOR MULTIPLE TYPES OF USER INTERFACES

(71) Applicant: CANON KABUSHIKI KAISHA, Tokyo (JP)

(72) Inventor: Jiro Shimosato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,786

(22) Filed: May 2, 2016

(65) Prior Publication Data

US 2016/0248970 A1 Aug. 25, 2016

Related U.S. Application Data

(63) Continuation of application No. 13/750,062, filed on Jan. 25, 2013, now Pat. No. 9,357,134.

(30) Foreign Application Priority Data

Jan. 31, 2012 (JP) ................. 2012-018639

(51) Int. Cl.
*H04N 5/232* (2006.01)
*G06F 3/041* (2006.01)
(Continued)

(52) U.S. Cl.
CPC ....... *H04N 5/23216* (2013.01); *G06F 3/0412* (2013.01); *G06F 3/0416* (2013.01);
(Continued)

(58) Field of Classification Search
CPC .......... H04N 5/23293; H04N 5/23296; H04N 5/23216; H04N 1/2125; H04N 1/0035;
(Continued)

(56) References Cited

U.S. PATENT DOCUMENTS 7,054,521 B2 * 5/2006 Hodgson ............ G01D 5/35383
 250/227.12
8,065,632 B2 * 11/2011 Bekki ................ H04N 1/00384
 715/810

(Continued)

FOREIGN PATENT DOCUMENTS

CN 1892561 A 1/2007
CN 101567974 A 10/2009
(Continued)

OTHER PUBLICATIONS

Office Action issued in corresponding Chinese Patent Application No. 201310034411.8 dated Aug. 12, 2016.
(Continued)

*Primary Examiner* — Pritham Prabhakher
(74) *Attorney, Agent, or Firm* — Carter, DeLuca, Farrell & Schmidt LLP

(57) ABSTRACT

An electronic apparatus includes a first operation unit and second operation unit, and performs the first function in accordance with an operation to the first operation unit and an operation to the second operation unit. When an instruction to perform the first function is accepted from an operation to the first operation unit, the electronic apparatus displays first operational display items for accepting, from an operation to the first operation unit, an instruction to perform the second function different from the first function. When an instruction to perform the first function is accepted from an operation to the second operation unit, the electronic apparatus displays second operational display items for
(Continued)

accepting, from an operation to the second operation unit, an instruction to perform the second function.

25 Claims, 6 Drawing Sheets

(51) Int. Cl.
G06F 3/048 (2013.01)
G06F 3/0482 (2013.01)
G06F 3/0484 (2013.01)
G06F 3/0488 (2013.01)

(52) U.S. Cl.
CPC .......... *G06F 3/0482* (2013.01); *G06F 3/0488* (2013.01); *G06F 3/04842* (2013.01); *H04N 5/23293* (2013.01)

(58) Field of Classification Search
CPC ...... G06F 3/005; G06F 3/0416; G06F 3/0412; G06F 3/0488; G06F 3/0482; G06F 3/04842
USPC .................................... 348/333.02
See application file for complete search history.

(56) References Cited

U.S. PATENT DOCUMENTS

| | | | |
|---|---|---|---|
| 8,228,412 B2* | 7/2012 | Hiratsuka | H04N 5/23293 348/207.99 |
| 8,547,467 B2 | 10/2013 | Kouda et al. | |
| 9,395,763 B2* | 7/2016 | Cho | G06F 1/1626 |
| 9,555,707 B2* | 1/2017 | Nakagawa | B60H 1/00985 |
| 9,753,630 B1* | 9/2017 | Kim | G06F 3/0485 |
| 2002/0105582 A1 | 8/2002 | Ikeda | |
| 2004/0027461 A1* | 2/2004 | Boyd | H04N 1/2112 348/222.1 |
| 2005/0195293 A1 | 9/2005 | Kobayashi et al. | |
| 2005/0219383 A1 | 10/2005 | Ikeda | |
| 2005/0237411 A1 | 10/2005 | Watanabe | |
| 2006/0072028 A1 | 4/2006 | Hong | |
| 2007/0064015 A1 | 3/2007 | Sugiyama et al. | |
| 2007/0147793 A1 | 6/2007 | Tabuchi et al. | |
| 2007/0188647 A1 | 8/2007 | Ikeda | |
| 2007/0200945 A1 | 8/2007 | Inukai | |
| 2007/0258005 A1 | 11/2007 | Koike et al. | |
| 2008/0084398 A1* | 4/2008 | Ito | G06F 1/1626 345/173 |
| 2008/0266407 A1 | 10/2008 | Battles et al. | |
| 2008/0297638 A1 | 12/2008 | Hiratsuka | |
| 2009/0195668 A1* | 8/2009 | Koh | H04N 5/23212 348/222.1 |
| 2009/0290849 A1 | 11/2009 | Ohtake et al. | |
| 2010/0060597 A1* | 3/2010 | Choi | G06F 3/04886 345/173 |
| 2010/0153876 A1* | 6/2010 | Kim | G06F 3/0482 715/800 |
| 2010/0251152 A1* | 9/2010 | Cho | G06F 1/1626 715/765 |
| 2011/0063236 A1* | 3/2011 | Arai | G06F 3/0488 345/173 |
| 2011/0199322 A1 | 8/2011 | Langlois et al. | |
| 2012/0105588 A1 | 5/2012 | Yamamoto | |
| 2012/0146924 A1* | 6/2012 | Inoue | G06F 3/0418 345/173 |
| 2012/0147242 A1 | 6/2012 | Kouda et al. | |
| 2012/0162242 A1* | 6/2012 | Amano | G06F 3/04886 345/592 |
| 2012/0176398 A1* | 7/2012 | Takaoka | G06F 3/04883 345/589 |
| 2012/0176503 A1 | 7/2012 | You | |
| 2013/0019174 A1* | 1/2013 | Gil | G06F 3/04812 715/711 |
| 2013/0055119 A1 | 2/2013 | Luong | |
| 2013/0073364 A1* | 3/2013 | Jung | G06Q 30/02 705/14.23 |
| 2013/0157647 A1* | 6/2013 | Kolodziej | H04W 4/046 455/419 |

FOREIGN PATENT DOCUMENTS

| | | |
|---|---|---|
| JP | H04205515 A | 7/1992 |
| JP | H05108230 A | 4/1993 |
| JP | H08-101759 A | 4/1996 |
| JP | H10200798 A | 7/1998 |
| JP | 2000-122779 A | 4/2000 |
| JP | 2004-104594 A | 4/2004 |
| JP | 2004-135271 A | 4/2004 |
| JP | 2005-266410 A | 9/2005 |
| JP | 2007-011459 A | 1/2007 |

OTHER PUBLICATIONS

Chinese Office Action issued in corresponding Chinese Patent Application No. 201310034411.8 dated Jul. 27, 2015.
Japanese Office Action issued in corresponding Japanese Patent Application No. 2012018639 dated Dec. 4, 2015.

* cited by examiner

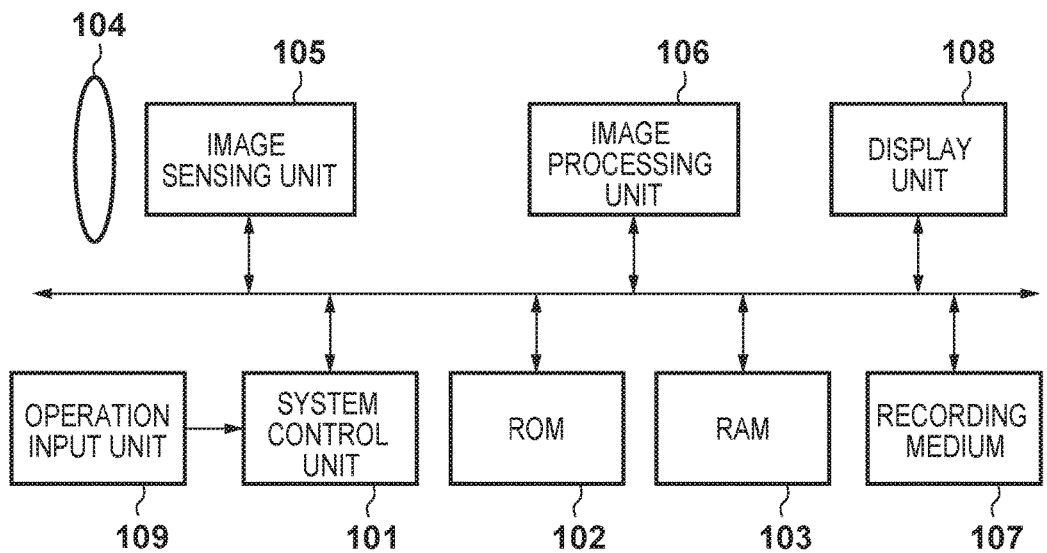
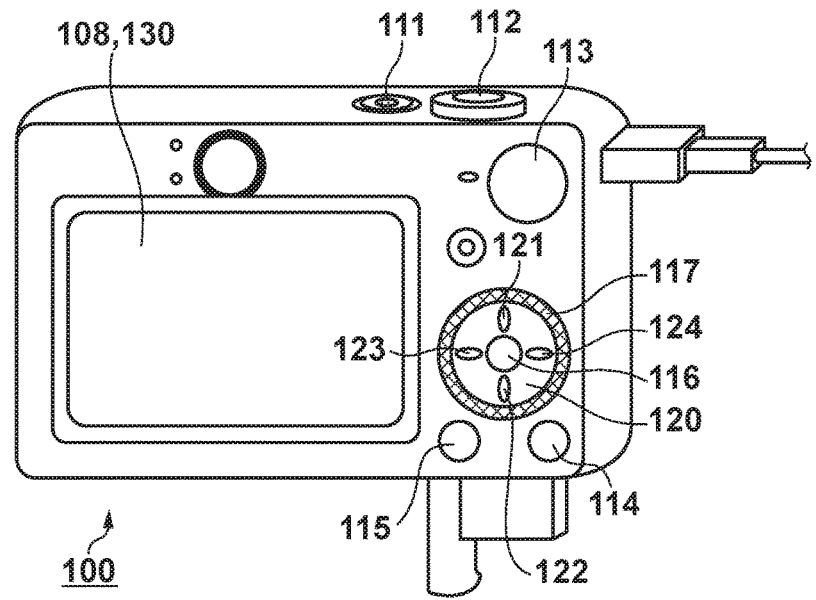

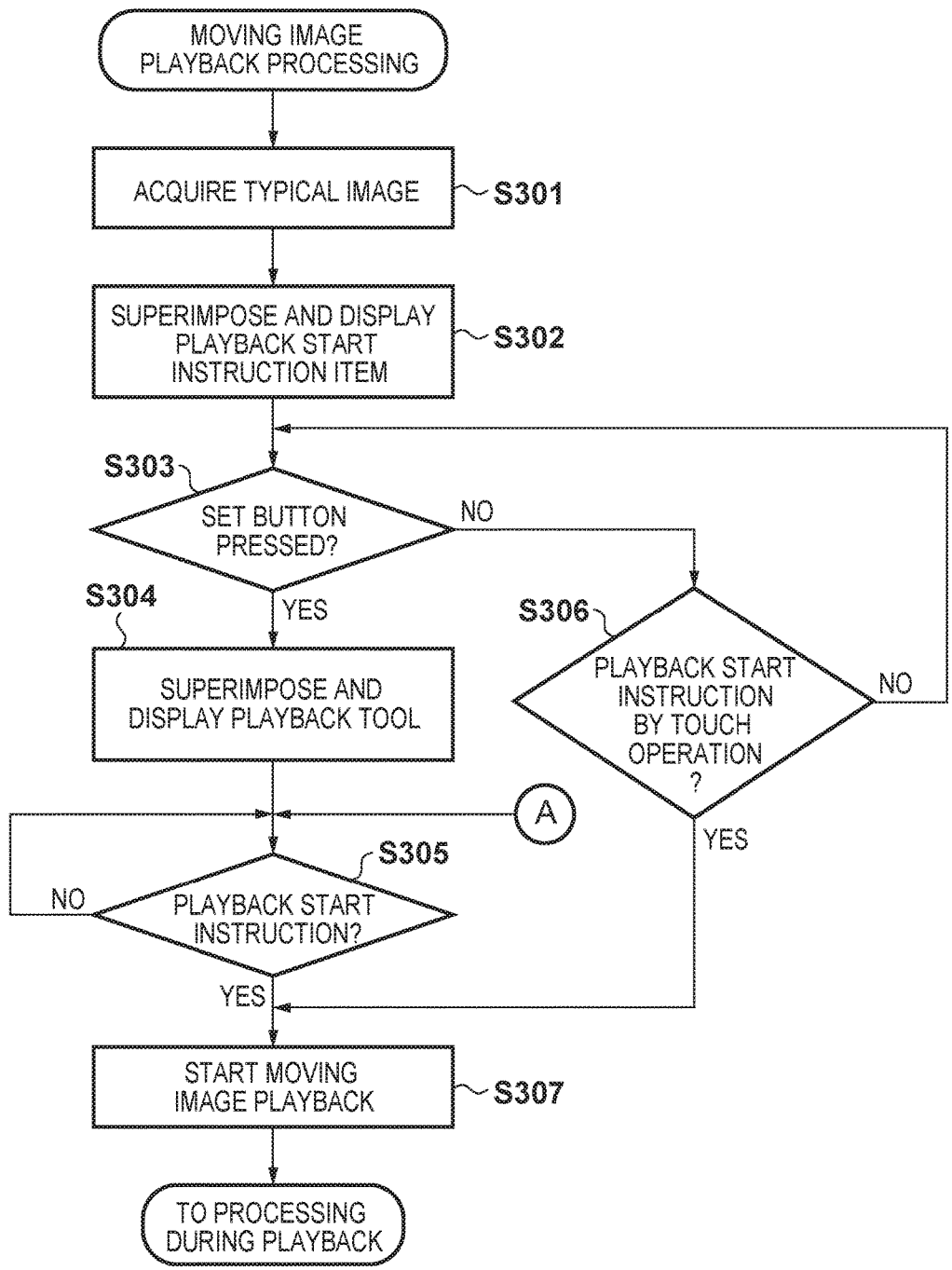

ELECTRONIC APPARATUS, IMAGE SENSING APPARATUS, CONTROL METHOD AND STORAGE MEDIUM FOR MULTIPLE TYPES OF USER INTERFACES

CROSS REFERENCE TO RELATED APPLICATIONS

This application is a continuation of U.S. patent application Ser. No. 13/750,062, filed on Jan. 25, 2013, which claims the benefit of and priority to Japanese Patent Application No. 2012-018639, filed on Jan. 31, 2012, the entire contents of each of which are hereby incorporated by reference herein in their entireties.

BACKGROUND OF THE INVENTION

Field of the Invention

The present invention relates to an electronic apparatus, image sensing apparatus, control method, and storage medium, and particularly to an input control technique for an apparatus including a plurality of types of user interfaces.

Description of the Related Art

Recently, there are many apparatuses each equipped with a display device including a touch panel sensor for which a human finger, stylus, and the like serve as input means. The user can intuitively operate an apparatus of this type by an operation of directly touching an item or the like displayed on the display device. A display device including a touch panel sensor has also been introduced into an image sensing apparatus such as a digital camera, and is used for operations and the like in playback of still images and moving images (Japanese Patent Laid-Open Nos. 2000-122779 and 2004-104594).

The introduction of a display device including a touch panel sensor can reduce physical operation members such as a switch arranged on the apparatus because various operation inputs can be implemented by switching the screen display. However, in an apparatus for which a customary operation method exists, such as an image sensing apparatus, a touch operation is not always an optimal input means for the user. For this reason, in an electronic apparatus such as an image sensing apparatus, both a physical operation member and touch operation are sometimes assigned as input means for one function.

As recent electronic apparatuses become multifunctional, a function selection item, operation instruction, and the like are displayed on the display device of the electronic apparatus. In this case, when a plurality of input means such as a physical operation member and touch operation are assigned to one function, as described above, the following problem occurs.

An item displayed on the display device for a touch operation has a predetermined size to avoid the need for a careful touch operation when a target to be touched is small, or to avoid erroneous recognition of a selected item as an adjacent item by the touch panel sensor. However, items displayed for touch operations may impair the visibility of the display device for the user when he operates the electronic apparatus using physical operation members.

When both an operation instruction in the use of physical operation members and an operation instruction in a touch operation are displayed, either operation instruction is unnecessary information for a user who prefers an operation using the other type of input means, and may impair the visibility of the display device. Also, when an operation instruction for either an operation with physical operation members or a touch operation is displayed, the user may change the operation method in accordance with the display contents. At this time, to change the operation method, the user needs to switch the hand holding the electronic apparatus main body or the operation member of the electronic apparatus from one to the other, complicating the user operation.

SUMMARY OF THE INVENTION

The present invention has been made to solve the conventional problems. The present invention provides an electronic apparatus, image sensing apparatus, control method, and storage medium for presenting appropriate information in accordance with a user operation.

The present invention in its first aspect provides an electronic apparatus comprising: a first operation unit; a second operation unit; a performing unit configured to perform a first function in accordance with one of an operation to the first operation unit and an operation to the second operation unit; and a display control unit configured to, when the performing unit performs the first function in accordance with an operation to the first operation unit, control a display unit to display first operational display items for accepting, from an operation to the first operation unit, an instruction to perform a second function different from the first function, and when the performing unit performs the first function in accordance with an operation to the second operation unit, control the display unit to display second operational display items for accepting, from an operation to the second operation unit, an instruction to perform the second function.

Further features of the present invention will become apparent from the following description of exemplary embodiments (with reference to the attached drawings).

BRIEF DESCRIPTION OF THE DRAWINGS

FIG. 1 is a block diagram showing the functional arrangement of a digital camera 100 according to an embodiment of the present invention;

FIG. 2 is a view for explaining operation members arranged in the digital camera 100 according to the embodiment of the present invention;

FIG. 3 is a flowchart exemplifying moving image playback processing according to the embodiment of the present invention;

DESCRIPTION OF THE EMBODIMENTS

Figure 4A:
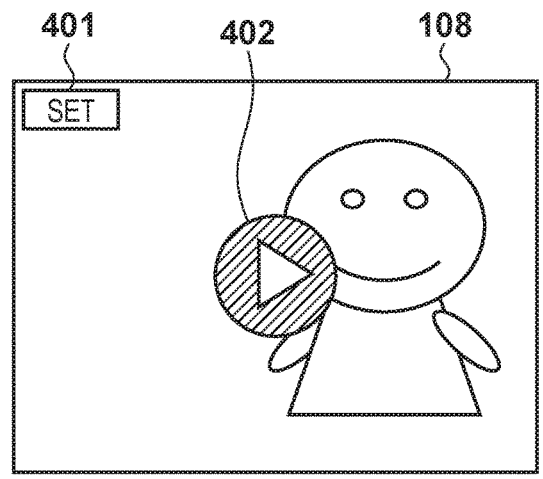
FIGS. 4A, 4B, and 4C are views each exemplifying a screen display in moving image playback according to the embodiment of the present invention.

An exemplary embodiment of the present invention will now be described in detail with reference to the accompanying drawings. Note that an embodiment set forth will describe an example of applying the present invention to a digital camera 100 serving as an example of an electronic apparatus in which a plurality of operations are associated with an instruction to perform one function. However, the present invention is applicable to an arbitrary apparatus in which operations to different types of operation members are assigned to one function.

In this specification, a "physical operation member" is an object having a fixed physical shape such as a button or switch, which is moved or rotated to detect an operation (to be also referred to as a "mechanical operation member"). To the contrary, a "touch operation" in this specification is an operation which is not accompanied by movement or rotation of an object having a fixed physical shape, and generates an electrical change when the touch operation is input. The touch operation is different from an operation input to a physical operation member. Note that the touch operation may be accompanied by deformation of an object having a fixed physical shape.

<Arrangement of Digital Camera 100>

FIG. 1 is a block diagram showing the functional arrangement of the digital camera 100 according to the embodiment of the present invention.

A system control unit 101 is, for example, a CPU, and controls the operation of each block of the digital camera 100. More specifically, the system control unit 101 reads out the operation program of moving image playback processing (to be described later) that is stored in a ROM 102, expands it in a RAM 103, and performs it, thereby controlling the operation of each block.

The ROM 102 is, for example, a rewritable nonvolatile memory, and stores the operation program of each block of the digital camera 100, such as the operation program of moving image playback processing. The ROM 102 stores parameters and the like necessary for the operation of each block.

The RAM 103 is a volatile memory, and is used not only as an expansion area for the operation program of each block of the digital camera 100, but also as a storage area which stores intermediate data output in the operation of each block.

An image sensing unit 105 includes an image sensor such as a CCD sensor or CMOS sensor. The image sensing unit 105 photoelectrically converts an optical image formed on the light-receiving surface of the image sensor via an imaging optical system 104, and generates an analog image signal. The image sensing unit 105 applies various processes including A/D conversion processing to the obtained analog image signal, outputting digital image data (to be simply referred to as an image hereinafter). In the embodiment, the image sensing unit 105 can capture at least a moving image.

An image processing unit 106 applies various image processes to an image output from the image sensing unit 105 or an image read out from a recording medium 107 (to be described later). Also, the image processing unit 106 performs composition processing to read out GUI data stored in the ROM 102 and superimpose the GUI on an image. In the embodiment, the image processing unit 106 performs composition processing to superimpose, on an image, items for issuing instructions to perform various functions associated with moving image playback in moving image playback.

The recording medium 107 is, for example, an internal memory in the digital camera 100, or a recording device such as an HDD or memory card removably connected to the digital camera 100. The recording medium 107 records images and moving images which have been output from the image sensing unit 105 and have undergone image processing by the image processing unit 106.

A display unit 108 is, for example, a display device such as an LCD arranged in the digital camera 100. The display unit 108 displays an image having undergone D/A conversion processing by the image processing unit 106. The display unit 108 functions as an electronic viewfinder by displaying an analog image signal output from the imaging optical system 104. The display unit 108 in the embodiment is a touch panel including a touch panel sensor 130 (to be described later) arranged on the display surface.

An operation input unit 109 manages an input from the user interface of the digital camera 100. More specifically, when the operation input unit 109 detects an operation performed by the user for each user interface, it outputs a control signal corresponding to the operation to the system control unit 101.

(User Interface of Digital Camera 100)

User interfaces arranged in the digital camera 100 according to the embodiment will be explained with reference to the outer appearance view of the digital camera 100 in FIG. 2.

As shown in FIG. 2, user interfaces arranged in the digital camera 100 according to the embodiment include, as physical operation members, a power switch 111, shutter button 112, mode switch 113, delete button 114, menu button 115, SET button 116, controller wheel 117, and four-way selector key 120.

The power switch 111 is an interface which switches the activation state of the digital camera 100.

The shutter button 112 is an interface for issuing a shooting preparation instruction and shooting instruction to the digital camera 100. The operation input unit 109 recognizes these two instructions in accordance with a stroke of pressing of the shutter button 112 by the user. More specifically, when the shutter button 112 changes to a halfway pressing state (half stroke), the operation input unit 109 generates an SW1 signal representing the shooting preparation instruction, and when the shutter button 112 changes to a full pressing state (full stroke), generates an SW2 signal representing the shooting instruction.

The mode switch 113 is an interface for switching the operation mode of the digital camera 100. The operation mode of the digital camera 100 includes, for example, a still image recording mode, moving image recording mode, and playback mode. Note that moving image playback processing (to be described later) is processing which is performed by the system control unit 101 when the mode switch 113 is set in the playback mode.

The delete button 114 is an interface for issuing an instruction to delete a still image or moving image recorded on the recording medium 107.

The menu button 115 is an interface for switching the presence/absence of a menu display for making various settings of the digital camera 100.

The SET button 116 is an interface for issuing, for example, an instruction to decide a selected item in the menu display.

The controller wheel 117 is an interface for, for example, switching the shooting mode between the aperture-priority mode, the shutter-priority mode, and the like in the still image shooting mode, and performing a manual focus adjustment operation.

The four-way selector key 120 is an interface for issuing, for example, an instruction to change a selected item in the menu display. The four-way selector key 120 includes an up button 121, down button 122, left button 123, and right button 124. By using these four buttons, the user can move, for example, an item selection frame and change an item to be selected. The four-way selector key 120 may be used for, for example, a volume change instruction, frame feeding instruction, and the like in moving image playback.

It will readily occur that the respective physical operation members are not limited to the above-described functions, and may be assigned to various operations in accordance with a state during processing.

User interfaces arranged in the digital camera 100 according to the embodiment include the touch panel sensor 130 different from a physical operation member. The touch panel sensor 130 is made of a material having a transmittance which ensures good visibility of display on the display unit 108. The touch panel sensor 130 is attached to the top layer of the display surface of the display unit 108. Coordinates at which a touch operation detected by the touch panel sensor 130 has been input are associated with display coordinates on the display unit 108. The sensing method of the touch panel sensor 130 suffices to be of a type capable of detecting a touch operation input with a person's finger or stylus, such as a resistive type, capacitance type, surface acoustic wave type, infrared type, electromagnetic induction type, image recognition type, or photosensor type.

The terms of touch operations (contact inputs) recognizable by the touch panel sensor 130, which are used in the description of this specification, will be explained.

Touch-down: touching the touch panel with a is or pen (start of a contact input to the touch panel)

Touch-on: a state in which a finger or pen is touching the touch panel (a state in which a contact input to the touch panel is in progress)

Move: moving a finger or pen while keeping it in contact with the touch panel (moving the contact position on the touch panel in the touch-on state)

Touch-up: releasing the finger or pen from the touch panel (end of a contact input to the touch panel after touch-on)

Flick: a touch-up operation immediately after move at a predetermined speed or higher (for example, flicking with a finger)

Touch-off: a state in which nothing touches the touch panel (a state in which there is no contact input)

Note that touch operations detected using the touch panel sensor 130 in the present invention are not limited to these six states.

<Moving Image Playback Processing>

Moving image playback processing associated with playback of a moving image recorded on the recording medium 107 in the digital camera 100 having the above-described arrangement according to the embodiment will be explained in detail with reference to the flowchart of FIG. 3. Processing corresponding to the flowchart can be implemented when, for example, the system control unit 101 reads out a corresponding processing program stored in the ROM 102, expands it in the RAM 103, and performs it. In the following embodiment, the moving image playback processing starts when, for example, the operation mode of the digital camera 100 is the playback mode and an instruction to display, on the display unit 108, one moving image file recorded on the recording medium 107 is issued.

In step S301, the system control unit 101 acquires a typical image of a moving image file (target moving image) for which the display instruction has been issued. More specifically, the system control unit 101 reads out the target moving image from the recording medium 107, expands it in the RAM 103, and acquires a typical image. Note that the typical image may be the image of a predetermined frame such as the first frame of a target moving image. The typical image may be embedded as metadata in the target moving image or an image file associated with the target moving image.

In step S302, the system control unit 101 reads out, from the ROM 102, GUI data of an item for accepting a target moving image playback start instruction. Then, the system control unit 101 transmits the GUI data to the image processing unit 106, and controls the image processing unit 106 to superimpose it on the typical image. The system control unit 101 transmits the item-superimposed typical image to the display unit 108, and controls the display unit 108 to display it.

Figure 4B:
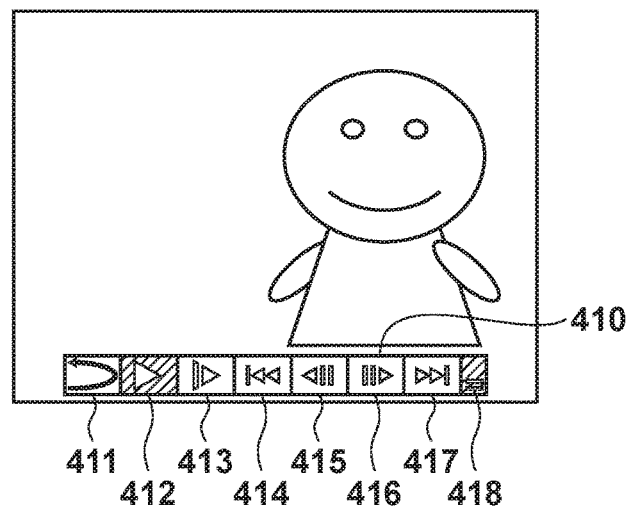

In the embodiment, as the item for accepting a target moving image playback instruction, two types of items 401 and 402 as shown in FIG. 4A are superimposed on a typical image. The item 401 is an item for notifying the user of an operation member which can be used to display a playback tool 410 including an item (playback item) 412 for a target moving image playback start instruction, as shown in FIG. 4B. The item 401 notifies the user that the playback tool 410 can be displayed by operating the SET button 116 out of physical operation members. The item 402 is an item for a target moving image playback start instruction in a touch operation.

In step S303, the system control unit 101 determines whether the user has pressed the SET button 116. More specifically, the system control unit 101 determines whether the SET button 116 has been pressed, by determining whether a control signal representing that the SET button 116 has been operated has been received from the operation input unit 109. If the system control unit 101 determines that the user has pressed the SET button 116, it shifts the process to step S304; if it determines that the user has not pressed the SET button 116, to step S306.

In step S304, the system control unit 101 reads out, from the ROM 102, GUI data of the playback tool 410 including the playback item 412 for the target moving image, transmits it to the image processing unit 106, and controls the image processing unit 106 to superimpose it on the typical image. The system control unit 101 transmits, to the display unit 108, the typical image on which the playback tool 410 is superimposed, and controls the display unit 108 to display the typical image. At this time, the playback tool 410 is displayed while the playback item 412 is selected (for example, color highlight display or display of a selection frame).

In step S305, the system control unit 101 determines whether the user has pressed the SET button 116 to issue an instruction to perform the playback start function while the playback item 412 is selected on the playback tool 410. Note that the system control unit 101 updates and manages information representing an item selected on the playback tool 410 every time, for example, control signals corresponding to the left button 123 and right button 124 used for instructions to switch a selection item are received. If the system control unit 101 determines that the user has pressed the SET button 116 while the playback item 412 is selected, it shifts the process to step S307; if it determines that the user has not pressed the SET button 116, repeats the processing of this step.

In addition to the playback item 412 for a moving image playback start instruction, the playback tool 410 includes items for instructing to perform other functions. In the example of FIG. 4B, the playback tool 410 includes a return instruction item 411, slow playback item 413, move-to-start item 414, frame reverse item 415, frame advance item 416, move-to-end item 417, and volume control item 418. The respective items correspond to a transition instruction to the screen of FIG. 4A, a slow playback start instruction, a display instruction for the first frame of a moving image, a display instruction for the image of an immediately preceding frame, a display instruction for the image of an immediately succeeding frame, a display instruction for the final frame of a moving image, and a volume control instruction.

In the moving image playback processing of the embodiment, whether a playback start instruction has been issued is determined in step S305 for the sake of simplicity. When an item other than the playback item 412 has been selected, the system control unit 101 performs processing corresponding to the item. More specifically, if the playback start instruction is issued while the return instruction item 411 is selected, the system control unit 101 returns the process to step S302 and controls the display unit 108 to display again a typical image on which the items 401 and 402 are superimposed. If the playback start instruction is issued while the frame reverse item 415, frame advance item 416, and move-to-end item 417 are selected, the system control unit 101 controls the display unit 108 to display the image of a corresponding frame on which the playback tool 410 is superimposed. If the playback start instruction is issued while the volume control item 418 is selected, the system control unit 101 changes the setting of an output to a loudspeaker (not shown) in accordance with the count at which control signals have been received from the up button 121 and down button 122 for changing the volume.

If the system control unit 101 determines in step S303 that the SET button 116 has not been pressed, it determines in step S306 whether a playback start instruction has been issued by a touch operation. More specifically, the system control unit 101 determines the presence/absence of a playback start instruction by determining whether a control signal representing that a touch operation has been input in a predetermined region set in correspondence with the item 402 has been received from the operation input unit 109. If the system control unit 101 determines that a playback start instruction has been issued by a touch operation, it shifts the process to step S307; if it determines that no playback start instruction has been issued, returns the process to step S303.

Figure 4C:
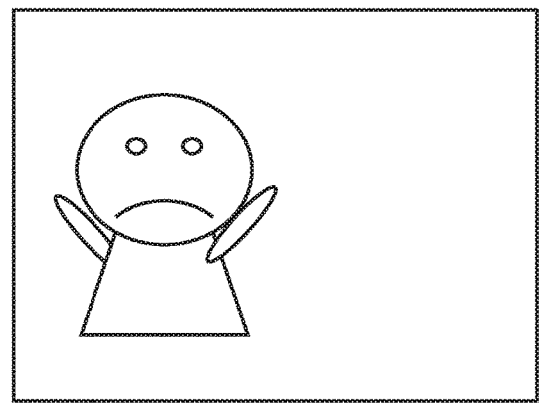
Figure 5:
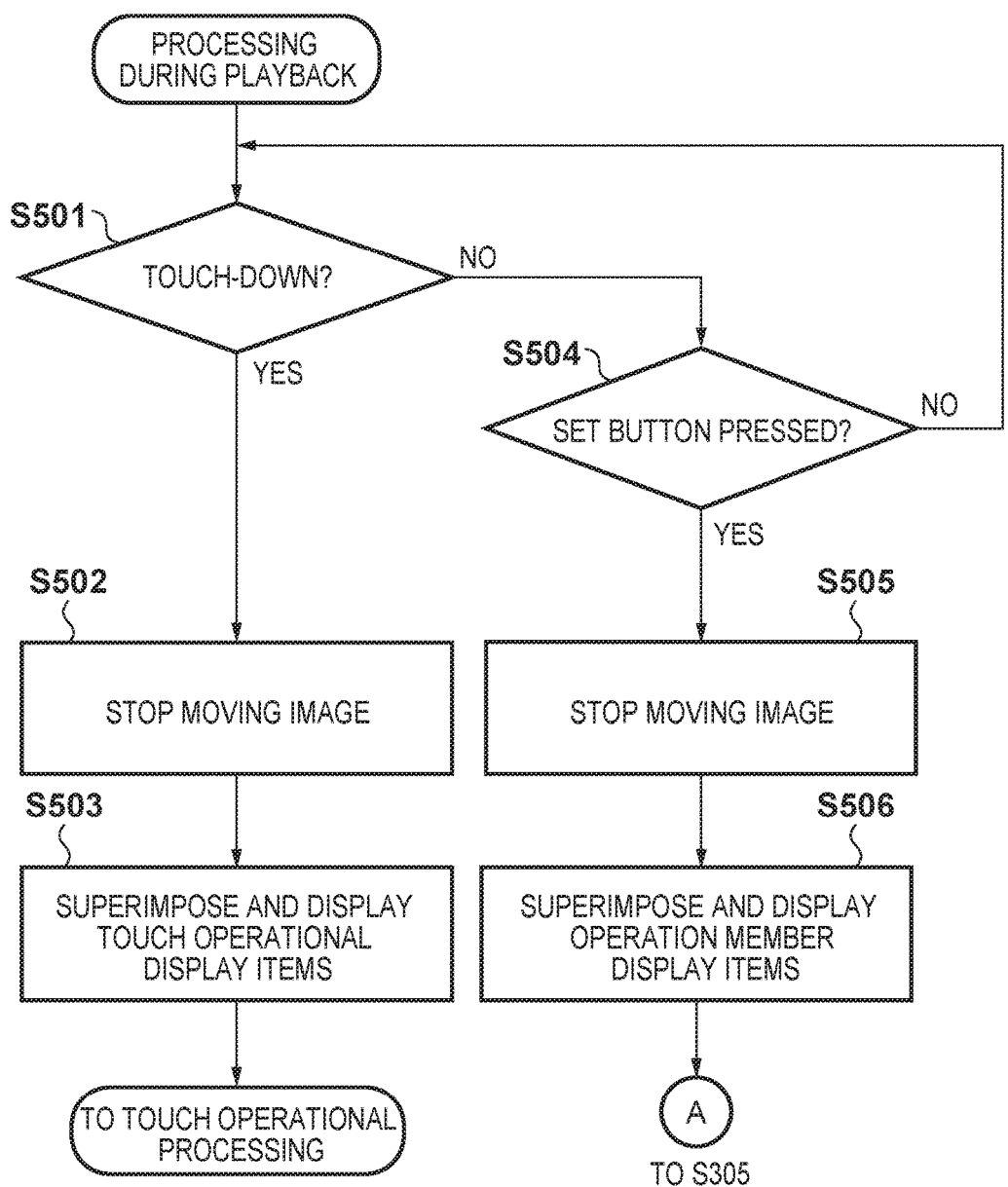
FIG. 5 is a flowchart exemplifying processing during playback according to the embodiment of the present invention.

In step S307, the system control unit 101 starts playback of a moving image from the position of a frame image displayed on the display unit 108. In the digital camera 100 according to the embodiment, only the image of a frame of a moving image is displayed on the display unit 108, as shown in FIG. 4C, in order to ensure good visibility of the moving image during playback. After the start of playback, processing during playback in FIG. 5 is performed.

(Processing During Playback)

Processing during playback which is performed during moving image playback in the digital camera 100 according to the embodiment will be explained with reference to the flowchart of FIG. 5.

In step S501, the system control unit 101 determines whether touch-down to the touch panel sensor 130 has been input. If the system control unit 101 determines that touch-down has been input, it shifts the process to step S502; if it determines that no touch-down has been input, to step S504.

In step S502, the system control unit 101 stops the moving image playback currently underway. In this manner, touch-down to the touch panel sensor 130 during moving image playback can issue a moving image playback stop instruction (instruction to perform the first function). Note that touch-down serving as a playback stop instruction may be input in any region on the display surface of the display unit 108.

Figure 6A:
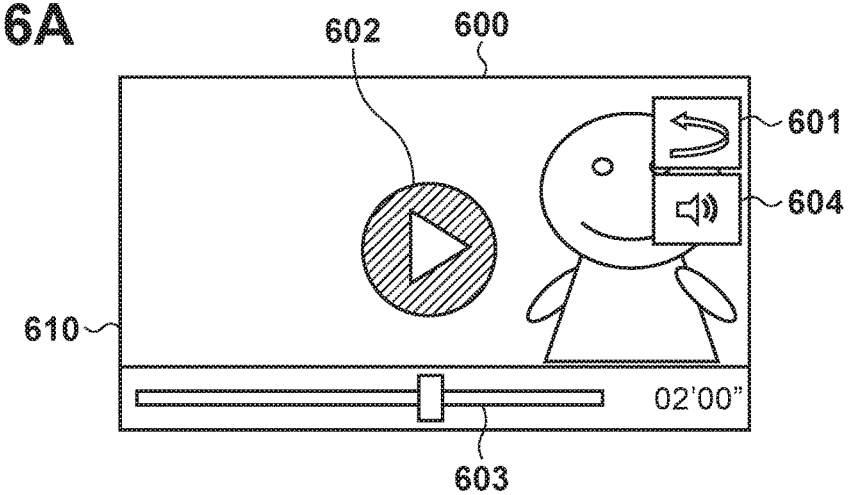
FIGS. 6A, 6B, and 6C are views for explaining an operation method using touch operational display items according to the embodiment of the present invention.

In step S503, the system control unit 101 reads out, from the ROM 102, GUI data of a return instruction touch item 601, playback touch item 602, sequence touch item 603, and volume control touch item 604 shown in FIG. 6A. The system control unit 101 transmits the readout items (touch operational display items) to the image processing unit 106, and controls the image processing unit 106 to generate a composite image 610 in which these items are superimposed on a stop frame image 600. The system control unit 101 transmits the obtained composite image 610 to the display unit 108, controls the display unit 108 to display it, and then performs Touch operational Processing to be described later with reference to FIG. 7.

In step S504, the system control unit 101 determines whether the SET button 116 has been pressed. If the system control unit 101 determines that the SET button 116 has been pressed, it shifts the process to step S505; if it determines that the SET button 116 has not been pressed, returns it to step S501.

In step S505, the system control unit 101 stops the moving image playback currently underway. In this way, a moving image playback stop instruction (instruction to perform the first function) can be issued by pressing the SET button 116 serving as a physical operation member during moving image playback.

In step S506, the system control unit 101 reads out, from the ROM 102, GUI data of the playback tool 410 (operation member display item) shown in FIG. 4B, transmits it to the image processing unit 106, and controls the image processing unit 106 to generate a composite image in which the GUI data is superimposed on the stop frame image 600. The system control unit 101 transmits the obtained composite image to the display unit 108, and controls the display unit 108 to display it. Then, the system control unit 101 shifts to the processing of step S305 in FIG. 3 described above.

As described above, when a playback stop instruction is issued for a moving image currently being played back, the digital camera 100 according to the embodiment switches a GUI to be displayed in accordance with whether the operation is an operation to a physical operation member or a touch operation detected by the touch panel sensor. The GUI to be displayed is formed from items for accepting an instruction to perform a function associated with playback of a stopped moving image. The GUI includes an item for accepting an instruction to perform at least one of the playback start function, volume control function, and frame feeding function. At this time, the GUI is displayed together with a frame image of the moving image. However, since the visibility of the frame image degrades in proportion to the size of the display area of the GUI, an item for accepting an instruction to perform the moving image playback stop function is hidden. That is, when an instruction to perform the first function is issued, the digital camera 100 according to the embodiment superimposes and displays, on a frame image, the GUI of a display item for accepting an instruction to perform the second function (for example, frame feeding) different the first function.

When a playback stop instruction is issued by an operation to a physical operation member, a GUI to be displayed is formed from only operation member display items for accepting, from an operation to a physical operation member, an instruction to perform a function associated with moving image playback. When a playback stop instruction is issued by a touch operation, a GUI to be displayed is formed from only touch operational display items for accepting, from a touch operation, an instruction to perform a function associated with moving image playback. More specifically, display items displayed upon receiving an instruction to perform the playback stop function are formed from only items for accepting only a performance instruction corresponding to an input means which has issued the instruction. With this setting, the digital camera 100 according to the embodiment can consistently perform, even after the stop of a moving image, an operation method (an operation to a physical operation member or a touch operation) which has been input by the user as a playback stop function performance instruction. In other words, the user can issue another performance instruction associated with moving image playback by an operation method of the same type without switching the hand holding the digital camera 100 from one to the other.

In the digital camera 100 according to the embodiment, the system control unit 101 may restrict operation inputs to be accepted, depending on which of operation member display items or touch operational display items are currently being displayed. More specifically, when a playback stop function performance instruction is issued using a physical operation member, the system control unit 101 may not accept, from a touch operation, an instruction to perform a function included in the operation member display items, that is, it accepts the instruction from only an operation to a physical operation member. In this case, even if the system control unit 101 receives, from the operation input unit 109, a control signal representing that a touch operation has been input, it does not process the control signal as an instruction to perform a function associated with moving image playback. When a playback stop function performance instruction is issued using a touch operation, the system control unit 101 may not accept, from an operation to a physical operation member, an instruction to perform a function associated with moving image playback that is included in the touch operational display items, that is, it accepts the instruction from only a touch operation. In this case, even if the system control unit 101 receives, from the operation input unit 109, a control signal representing that an operation to a physical operation member has been input, it does not process the control signal as an instruction to perform a function associated with moving image playback. Note that an instruction to perform a function other than the function associated with moving image playback, for example, an instruction to perform a function to escape from the screen of FIG. 4A may be issued by a physical operation member. In the embodiment, an instruction to escape from the screen of FIG. 4A may be accepted in response to pressing of the SET button 116. An operation to escape from the operation of FIG. 4A in which an instruction to perform a function associated with moving image playback is issued by only a touch operation is considered to be input in a situation in which a series of operations associated with moving image playback has ended. In this situation, the user may switch the hand holding the digital camera 100 from one to the other.

As described above, each touch operation display item has a predetermined size to avoid the need for a careful touch operation when a target to be touched with a finger becomes small, or to avoid erroneous recognition of a selected item as an adjacent item by the touch panel sensor. To the contrary, each operation member display item need not be equal in size to a touch operation display item. Each operation member display item suffices to have a size enough to allow visual recognition and selection of a physical operation member. Thus, each operation member display item can be smaller than the display range of a touch operation display item for accepting an instruction to perform the same function.

When operation member display items or touch operational display items are displayed in the above-described processing during playback, and then the user issues an instruction to perform a function assigned to each item, the system control unit 101 performs corresponding processing. For example, when the user presses the SET button 116 while selecting the playback item 412, or touches the playback touch item 602 to issue an instruction to perform the playback start function, the system control unit 101 starts the process from step S307 of moving image playback processing.

<Touch Operational Processing>

Figure 7:
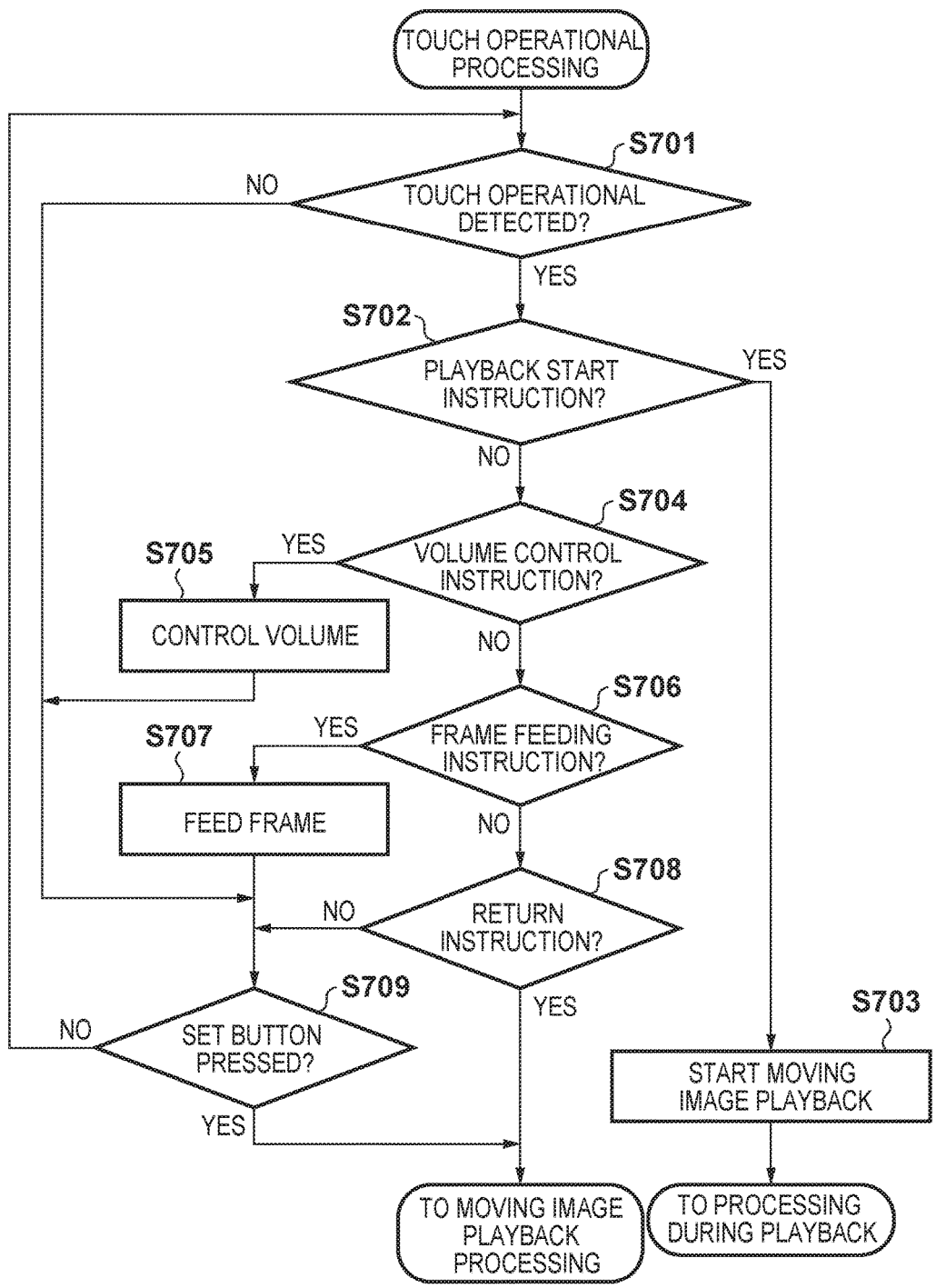
FIG. 7 is a flowchart exemplifying Touch operational Processing according to the embodiment of the present invention.

Touch operational Processing to perform processing corresponding to a touch operation input when touch operational display items are displayed on the display unit 108 in the digital camera 100 according to the embodiment will be explained with reference to FIG. 7.

In step S701, the system control unit 101 determines whether a touch operation has been detected. More specifically, the system control unit 101 determines whether a touch operation has been detected, by determining whether a control signal corresponding to a touch operation input on the touch panel has been received from the operation input unit 109. If the system control unit 101 determines that a touch operation has been detected, it shifts the process to step S702; if it determines that no touch operation has been detected, to step S709.

In step S702, the system control unit 101 determines whether the detected touch operation is a touch operation to the playback touch item 602 that is an instruction to perform the playback start function. More specifically, the system control unit 101 refers to information about coordinates at which the touch operation acquired from the operation input unit 109 has been input, and determines whether the coordinates fall within a region of a predetermined size set in correspondence with the playback touch item 602. If the system control unit 101 determines that the detected touch operation is a touch operation to the playback touch item 602, it shifts the process to step S703; if it determines that the detected touch operation is not a touch operation to the playback touch item 602, to step S704.

In step S703, the system control unit 101 starts playing back a moving image from the current frame, and then performs the above-described processing during playback in FIG. 5.

In step S704, the system control unit 101 determines whether the detected touch operation is a touch operation to the volume control touch item 604 that is an instruction to perform the volume control function. More specifically, the system control unit 101 refers to information about coordinates at which the touch operation acquired from the operation input unit 109 has been input, and determines whether the coordinates fall within a region of a predetermined size set in correspondence with the volume control touch item 604. If the system control unit 101 determines that the detected touch operation is a touch operation to the volume control touch item 604, it shifts the process to step S705; if it determines that the detected touch operation is not a touch operation to the volume control touch item 604, to step S706.

Figure 6B:
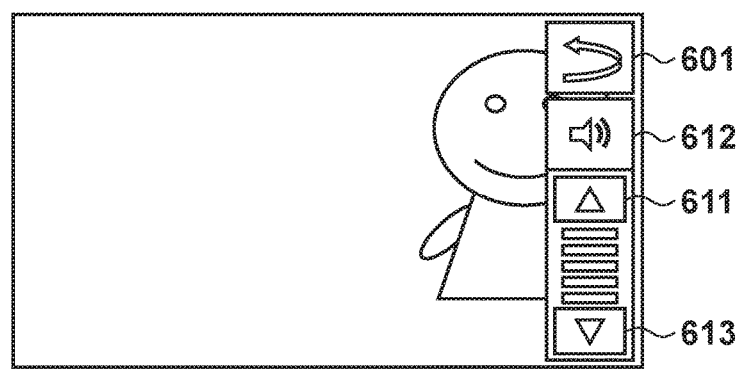

In step S705, the system control unit 101 accepts the touch operation associated with volume control, and stores information about the controlled volume as volume information in the RAM 103. Note that the volume information is reflected in an audio signal to be output to a loudspeaker (not shown) in moving image playback. At this time, to ensure good visibility of the display unit 108, the system control unit 101 may control the display not to superimpose items other than a detailed volume control item 612 and the return instruction touch item 601, as shown in FIG. 6B. The volume is controlled by, for example, a volume-up button 611 or volume-down button 613 after touch-down to the volume control touch item 604, or a move operation input for the detailed volume control item 611. If the system control unit 101 recognizes the completion of the volume control operation from a touch operation to the return instruction touch item 601, it shifts the process to step S709.

In step S706, the system control unit 101 determines whether the detected touch operation is a touch operation (move) to the sequence touch item 603 that is an instruction to perform the frame feeding function. More specifically, the system control unit 101 refers to information about coordinates at which the touch-down acquired from the operation input unit 109 has been input, and determines whether the coordinates fall within a region of a predetermined size set in correspondence with the sequence touch item 603. If the system control unit 101 determines that the detected touch operation is a touch operation to the sequence touch item 603, it shifts the process to step S707; if it determines that the detected touch operation is not a touch operation to the sequence touch item 603, to step S708.

Figure 6C:
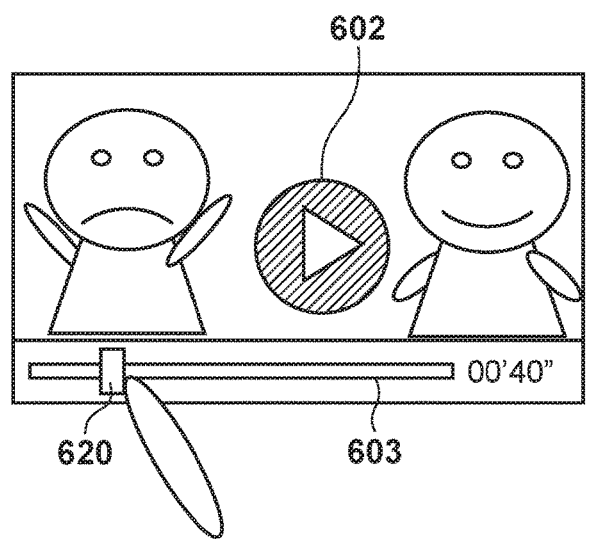

In step S707, the system control unit 101 reads out, from the RAM 103 or recording medium 107, the image of a designated frame of a moving image that corresponds to a frame index 620 moved by the move on the sequence touch item 603, and transmits it to the image processing unit 106. Also, the system control unit 101 reads out GUI data of the sequence touch item 603 and playback touch item 602 from the ROM 102, transmits them to the image processing unit 106, and controls the image processing unit 106 to superimpose them on the designated frame image. In the digital camera 100 according to the embodiment, the system control unit 101 may control the display not to superimpose items other than the playback touch item 602 and sequence touch item 603, as shown in FIG. 6C, in order to ensure good visibility of a frame image when a frame feeding operation is input. If the system control unit 101 detects, from a touch-up operation, the completion of moving the frame index, it shifts the process to step S709.

In step S708, the system control unit 101 determines whether the detected touch operation is a touch operation to the return instruction touch item 601. More specifically, the system control unit 101 refers to information about coordinates at which the touch operation acquired from the operation input unit 109 has been input, and determines whether the coordinates fall within a region of a predetermined size set in correspondence with the return instruction touch item 601. If the system control unit 101 determines that the detected touch operation is a touch operation to the return instruction touch item 601, it shifts the process to step S301 of the above-described moving image playback processing in FIG. 3; if it determines that the detected touch operation is not a touch operation to the return instruction touch item 601, to step S709.

In step S709, the system control unit 101 determines whether the SET button 116 has been pressed. If the SET button 116 has been pressed, the system control unit 101 returns the process to step S301 of the above-described moving image playback processing in FIG. 3. If the SET button 116 has not been pressed, the system control unit 101 returns the process to step S701.

As described above, the electronic apparatus according to the embodiment can present appropriate information in accordance with a user operation. More specifically, the electronic apparatus includes physical operation members and a touch panel which detects a touch operation, and accepts both an operation to the physical operation member and a touch operation. When an instruction to perform the first function is accepted from an operation to the physical operation member, the electronic apparatus displays operation member display items for accepting, from an operation to the physical operation member, an instruction to perform the second function different from the first function. When an instruction to perform the first function is accepted from a touch operation, the electronic apparatus displays touch operational display items for accepting, from a touch operation, an instruction to perform the second function.

With this setting, when touch operational display items are displayed, the digital camera 100 according to the embodiment can perform a function associated with moving image playback only by a touch operation while ensuring good visibility.

Note that control by the digital camera 100 may be performed by one hardware unit, or a plurality of hardware units may share processing to control the overall apparatus.

The present invention has been described in detail based on its preferred embodiments. However, the present invention is not limited to these specific embodiments, and includes various forms without departing from the gist of the invention. Further, each embodiment described above is merely an embodiment of the present invention, and the embodiments can be appropriately combined.

In the above-described embodiments, the present invention is applied to the digital camera 100. However, the present invention is not limited to the above example, and is also applicable to an arbitrary apparatus in which operations to different types of operation members are assigned to one function. More specifically, the present invention is applicable to a personal computer, a PDA, a mobile phone, a portable image viewer, a printer apparatus with a display, a digital photo frame, a music player, a game machine, an electronic book reader, and the like.

As an example of assigning operations to a plurality of input means to perform one function, the embodiment has explained processes for an operation to a physical operation member and a touch operation. However, the practice of the present invention is not limited to this. The present invention is applicable to an electronic apparatus in which operation methods by different types of operation members are assigned to one function.

For example, the present invention is applicable to a PC to which a mouse is connected as an operation member of the first type and a keyboard is connected as an operation member of the second type. In this case, the control unit of the PC changes the display contents of an information display depending on which of the mouse and keyboard has been used to issue an instruction to perform the first function accompanied by the information display associated with an operation to the operation member. More specifically, when an image display instruction serving as the first function is issued, the control unit changes an information display which is displayed on the display device and pertains to the operation methods of an enlargement/reduction instruction and rotation instruction serving as the second function. For example, when an image display instruction is issued using the mouse (first detection: for example, double-clicking a file), the control unit superimposes and displays, on an image, icons selectable with the mouse to issue an enlargement/reduction instruction and rotation instruction. When an image display instruction is issued using the keyboard (second detection: for example, pressing the Enter key while selecting a file), the control unit superimposes and displays, on an image, the notifications of shortcut keys to which an enlargement/reduction instruction and rotation instruction are assigned. With this setting, the user can perform a series of operations without switching the hand holding the operation member to be operated from one to the other.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electronic apparatus comprising:
    a first operation unit including one or more buttons;
    a second operation unit consisting of a touch panel separate from the one or more buttons; and
    a memory and at least one processor which function as:
        a performing unit configured to perform a first function and a second function, wherein the first function is able to be performed in accordance with operation to only the first operation unit, the first function is also able to be performed in accordance with operation to only the second operation unit, and the second function is able to be performed after the first function; and
        a display control unit configured to control displaying first operational display items in a case where the first function is performed in accordance with the operation to only the first operation unit, and to control displaying second operational display items in a case where the first function is performed in accordance with the operation to only the second operation unit,
    wherein a size of a second item, which is included in the second operational display items and is for instructing the performance of the second function, is larger than a size of a first item, which is included in the first operational display items and is for instructing the performance of the second function, or wherein the number of the first operational display items is larger than the number of the second operational display items,
    wherein the second function is performed in accordance with operation to only the first operation unit for selecting the first item, and
    wherein the second function is performed in accordance with operation to only the second operation unit when the second operational display items are displayed.

2. The apparatus according to claim 1, wherein the touch panel is configured to accept a touch operation to a display unit.

3. The apparatus according to claim 2, wherein the first operation unit includes a hardware operation member different from the touch panel.

4. The apparatus according to claim 1, wherein the performing unit makes an operation member, for which operation for instructing to perform the second function is able to be performed, different depending on which one of the first operational display items or the second operational display items are displayed on a display unit when the operation for instructing to perform the second function is to be accepted.

5. The apparatus according to claim 1, wherein the second function is performed in accordance with operation to only the second operation unit for selecting an item included in the second operational display items, when the second operational display items are displayed.

6. The apparatus according to claim 1, wherein the performance of the second function in accordance with operation to only the second operation unit is restricted while the first operational display items are displayed.

7. The apparatus according to claim 1, wherein the performance of the second function in accordance with operation to only the first operation unit is restricted while the second operational display items are displayed.

8. The apparatus according to claim 1, wherein the first function includes a moving image playback stop function.

9. The apparatus according to claim 1, wherein the second function includes at least one of a moving image playback start function, a moving image volume control function, and a function for changing a current position of a moving.

10. The apparatus according to claim 1, wherein the size of the second item is larger than the size of the first item, and wherein the number of the first operational display items is different from the number of the second operational display items.

11. The apparatus according to claim 1, wherein the display control unit controls a display unit to display an image on which the first operational display items or the second operational display items are superimposed.

12. The apparatus according to claim 1, wherein the first operation unit includes a first button configured to switch a selected item out of the first operational display items, and a second button configured to issue an instruction to perform a function corresponding to the selected item.

13. The apparatus according to claim 1, wherein the first operation unit is configured to input an operation to the electronic apparatus when a button is pushed down.

14. The apparatus according to claim 1, wherein the electronic apparatus is an image sensing apparatus including an image sensing unit configured to be able to capture a moving image.

15. The apparatus according to claim 1, wherein appearances of the first operational display items and appearances of the second operational display items are different.

16. The apparatus according to claim 1, wherein the display control unit controls a display unit to display, either an item for accepting an operation to the first operation unit or an item for accepting an operation to the second operation unit, wherein both items are for performing the same function.

17. The apparatus according to claim 1, wherein performance of the second function by the performing unit in accordance with operation to only the second operation unit is disabled while the first operational display items are displayed on the display.

18. A method for controlling an electronic apparatus comprising a first operation unit and a second operation unit, wherein the first operation unit includes one or more buttons and a second operation unit consists of a touch panel separate from the one or more buttons, the method comprising:

performing a first function and a second function, wherein the first function is able to be performed in accordance with operation to only the first operation unit, the first function is also able to be performed in accordance with operation to only the second operation unit, and the second function is able to be performed after the first function;

controlling displaying first operational display items in a case where the first function is performed in accordance with the operation to only the first operation unit; and controlling displaying second operational display items in a case where the first function is performed in accordance with the operation to only the second operation unit, wherein a size of a second item, which is included in the second operational display items and is for instructing the performance of the second function, is larger than a size of a first item, which is included in the first operational display items and is for instructing the performance of the second function, or wherein the number of the first operational display items is larger than the number of the second operational display items, wherein the second function is performed in accordance with operation to only the first operation unit for selecting the first item, and wherein the second function is performed in accordance with operation to only the second operation unit when the second operational display items are displayed.

19. A non-transitory computer readable storage medium storing a program for causing a processor of an electronic apparatus, which comprises a first operation unit and a second operation unit, wherein the first operation unit includes one or more buttons and a second operation unit consists of a touch panel separate from the one or more buttons, to:

perform a first function and a second function, wherein the first function is able to be performed in accordance with operation to only the first operation unit, the first function is also able to be performed in accordance with operation to only the second operation unit, and the second function is able to be performed after the first function;

control displaying first operational display items in a case where the first function is performed in accordance with the operation to only the first operation unit; and control displaying second operational display items in a case where the first function is performed in accordance with the operation to only the second operation unit, wherein a size of a second item, which is included in the second operational display items and is for instructing the performance of the second function, is larger than a size of a first item, which is included in the first operational display items and is for instructing the performance of the second function, or wherein the number of the first operational display items is larger than the number of the second operational display items, wherein the second function is performed in accordance with operation to only the first operation unit for selecting the first item, and wherein the second function is performed in accordance with operation to only the second operation unit when the second operational display items are displayed.

20. An electronic apparatus comprising:
a first operation unit including one or more buttons;
a second operation unit consisting of a touch panel separate from the one or more buttons; and
a memory and at least one processor which function as:
a performing unit configured to perform a first function and a second function, wherein the first function is able to be performed in accordance with operation to only the first operation unit, the first function is also able to be performed in accordance with operation to only the second operation unit, and the second function is able to be performed after the first function, and a display control unit configured to control displaying first operational display items in a case where the first function is performed in accordance with the operation to only the first operation unit, and to control displaying second operational display items in a case where the first function is performed in accordance with the operation to only the second operation unit, wherein the second function is performed in accordance with an operation for selecting a first item, which is included in the first operational display items and is an item for instructing the performance of the second function, to only the first operation unit, wherein the second function is performed in accordance with an operation to only the second operation unit when the second operational display items are displayed, and wherein the performance of the second function in accordance with an operation to only the second operation unit is restricted while the first operational display items are displayed.

21. A method for controlling an electronic apparatus comprising a first operation unit and a second operation unit, wherein the first operation unit includes one or more buttons and the second operation unit consists of a touch panel separate from the one or more buttons, the method comprising:

performing a first function and a second function, wherein the first function is able to be performed in accordance with operation to only the first operation unit, the first function is also able to be performed in accordance with operation to only the second operation unit, and the second function is able to be performed after the first function;

controlling displaying first operational display items in a case where the first function is performed in accordance with the operation to only the first operation unit; and controlling displaying second operational display items in a case where the first function is performed in accordance with the operation to only the second operation unit, wherein the second function is performed in accordance with an operation for selecting a first item, which is included in the first operational display items and is an item for instructing the performance of the second function, to only the first operation unit, wherein the second function is performed in accordance with an operation to only the second operation unit when the second operational display items are displayed, and wherein the performance of the second function in accordance with an operation to only the second operation unit is restricted while the first operational display items are displayed.

22. A non-transitory computer readable storage medium storing a program for causing a processor of an electronic apparatus, which comprises a first operation unit and a second operation unit, wherein the first operation unit includes one or more buttons and the second operation unit consists of a touch panel separate from the one or more buttons, to:
perform a first function and a second function, wherein the first function is able to be performed in accordance with operation to only the first operation unit, the first function is also able to be performed in accordance with operation to only the second operation unit, and the second function is able to be performed after the first function;
control displaying first operational display items in a case where the first function is performed in accordance with the operation to only the first operation unit; and
control displaying second operational display items in a case where the first function is performed in accordance with the operation to only the second operation unit,
wherein the second function is performed in accordance with an operation for selecting a first item, which is included in the first operational display items and is an item for instructing the performance of the second function, to only the first operation unit,
wherein the second function is performed in accordance with an operation to only the second operation unit when the second operational display items are displayed, and
wherein the performance of the second function in accordance with an operation to only the second operation unit is restricted while the first operational display items are displayed.

23. An electronic apparatus comprising:
a first operation unit including one or more buttons;
a second operation unit consisting of a touch panel separate from the one or more buttons; and
a memory and at least one processor which function as:
a performing unit configured to perform a first function and a second function, wherein the first function is able to be performed in accordance with operation to only the first operation unit, the first function is also able to be performed in accordance with operation to only the second operation unit, and the second function is able to be performed after the first function; and
a display control unit configured to control displaying first operational display items in a case where the first function is performed in accordance with the operation to only the first operation unit, and to control displaying second operational display items in a case where the first function is performed in accordance with the operation to only the second operation unit,
wherein the second function is performed in accordance with an operation for selecting a first item, which is included in the first operational display items and is an item for instructing the performance of the second function, to only the first operation unit,
wherein the second function is performed in accordance with an operation to only the second operation unit when the second operational display items are displayed, and wherein the performance of the second function in accordance with an operation to only the first operation unit is restricted while the second operational display items are displayed.

24. A method for controlling an electronic apparatus including a first operation unit and a second operation unit, wherein the first operation unit includes one or more buttons and the second operation unit consists of a touch panel separate from the one or more buttons, the method comprising:
performing a first function and a second function, wherein the first function is able to be performed in accordance with operation to only the first operation unit, the first function is also able to be performed in accordance with operation to only the second operation unit, and the second function is able to be performed after the first function;
controlling displaying first operational display items in a case where the first function is performed in accordance with the operation to only the first operation unit; and
controlling displaying second operational display items in a case where the first function is performed in accordance with the operation to only the second operation unit,
wherein the second function is performed in accordance with an operation for selecting a first item, which is included in the first operational display items and is an item for instructing the performance of the second function, to only the first operation unit,
wherein the second function is performed in accordance with an operation to only the second operation unit when the second operational display items are displayed, and
wherein the performance of the second function in accordance with an operation to only the first operation unit is restricted while the second operational display items are displayed.

25. A non-transitory computer readable storage medium storing a program for causing a processor of an electronic apparatus, which comprises a first operation unit and a second operation unit, wherein the first operation unit includes one or more buttons and the second operation unit consists of a touch panel separate from the one or more buttons, to:
perform a first function and a second function, wherein the first function is able to be performed in accordance with operation to only the first operation unit, the first function is also able to be performed in accordance with operation to only the second operation unit, and the second function is able to be performed after the first function;
control displaying first operational display items in a case where the first function is performed in accordance with the operation to only the first operation unit; and
control displaying second operational display items in a case where the first function is performed in accordance with the operation to only the second operation unit,
wherein the second function is performed in accordance with an operation for selecting a first item, which is included in the first operational display items and is an item for instructing the performance of the second function, to only the first operation unit,
wherein the second function is performed in accordance with an operation to only the second operation unit when the second operational display items are displayed, and wherein the performance of the second function in accordance with an operation to only the first operation unit is restricted while the second operational display items are displayed.

* * * * *